United States Patent [19]

Mork

[11] Patent Number: 4,585,075
[45] Date of Patent: Apr. 29, 1986

[54] SOIL LEVELING APPARATUS WITH IMPROVED FRAME AND HITCH

[76] Inventor: Orlan H. Mork, 6029 - 225th St. W., Farmington, Minn. 55024

[21] Appl. No.: 570,347

[22] Filed: Jan. 13, 1984

Related U.S. Application Data

[63] Continuation-in-part of Ser. No. 224,458, Jan. 12, 1981, Pat. No. 4,448,258.

[51] Int. Cl.⁴ .................. A01B 49/02; A01B 59/043
[52] U.S. Cl. .................. 172/197; 172/445.1; 172/449
[58] Field of Search ............ 172/445.1, 197, 248, 172/449, 439, 445.2; 280/461 A, 497

[56] References Cited

U.S. PATENT DOCUMENTS

| | | | |
|---|---|---|---|
| 1,833,878 | 11/1931 | Adams | 404/118 |
| 2,302,702 | 11/1942 | Leschinsky | 172/197 |
| 2,346,757 | 4/1944 | Horner | 172/449 |
| 2,817,203 | 12/1957 | Sievers | 172/684.5 |
| 3,193,306 | 7/1965 | Pettit | 172/449 X |
| 3,556,228 | 1/1971 | Mork | 172/445.1 |
| 3,834,465 | 9/1974 | Collins | 172/197 |
| 3,904,380 | 9/1975 | Smith | 52/732 |
| 3,905,425 | 9/1975 | Jackson | 172/449 |
| 4,196,778 | 4/1980 | Smith | 172/445.1 |
| 4,239,251 | 12/1980 | Rocksvold | 172/449 |
| 4,418,759 | 12/1983 | Mork | 172/197 |
| 4,448,258 | 5/1984 | Mork | 172/197 |

FOREIGN PATENT DOCUMENTS

| | | | |
|---|---|---|---|
| 1074994 | 4/1980 | Canada | 172/197 |
| 1173395 | 8/1969 | Denmark | 172/197 |
| 430341 | 6/1926 | Fed. Rep. of Germany | 172/684.5 |

Primary Examiner—Richard J. Johnson
Attorney, Agent, or Firm—Merchant, Gould, Smith, Edell, Welter & Schmidt

[57] ABSTRACT

An improved soil leveling apparatus (10) includes a frame (12), connecting hitch means (14), and adjustable lost motion linkage (48) secured to the top connection point (52) of the hitch, and an optional scarifier assembly (16) which is supported on a connector (66) pivoted between the legs (36,40) of the hitch. The scraper member (18) of the frame (12) is of generally inverted J-shaped cross section, and tine subassemblies (90) can be substituted for the teeth (78) on the scarifier assembly (12).

8 Claims, 11 Drawing Figures

SOIL LEVELING APPARATUS WITH IMPROVED FRAME AND HITCH

CROSS REFERENCE TO RELATED APPLICATION

This application is a continuation-in-part of my co-pending Application Ser. No. 224,458, filed Jan. 12, 1981, now U.S. Pat. No. 4,448,258.

TECHNICAL FIELD

The present invention relates generally to a device for attachment to a vehicle for cutting, leveling and otherwise grading soil or the like. More particularly, this invention concerns a soil leveling apparatus incorporating an improved frame, an improved hitch, an improved scarifier assembly, an optional pulverizer attachment, and other features which provide more versatility and controlability in order to achieve better performance.

BACKGROUND ART

Proper site preparation requires that the ground be graded as necessary for compatibility with planting, sodding, paving or whatever the next and usually final construction or maintenance step may be. Such site preparation typically involves first breaking up and loosening the soil as necessary followed by leveling the soil to the desired grade. This may entail the use of different tools, depending upon the soil conditions, and multiple passes over the site which is both time consuming and expensive.

In the past weighted boards and the like were dragged behind tractors to smooth and level the surface of the soil. This technique was relatively crude and unsatisfactory because it did not allow for controlling the angle or grade of the soil surface, and loose dirt tended to collect in front of the board which would escape around the outer edges leaving ridges which then had to be smoothed manually with rakes or the like.

My prior U.S. Pat. No. 3,556,228 shows an apparatus for leveling soil and the like which was adapted to overcome the difficulties associated with the prior art at that time. This device generally consisted of a frame adapted for connection to a threepoint hitch on a draft vehicle such as a tractor. The frame consisted of a number of transverse ground engaging members arranged in longitudinally spaced apart relationship. The leading member therein was a member of generally inverted U-shaped cross section to effect cutting, while the other trailing members were of closed, generally rectangular cross section for leveling purposes. The transverse ground engaging members were interconnected by longitudinal braces in a ladder-like fashion to form a rigid frame. Individual retaining shoes or plates were provided on opposite ends of each ground engaging member to retain loose soil to avoid formation of soil ridges.

This device operated well and was a significant improvement over the prior art at that time, although experience later showed that improvements could be made. The parent hereof, referenced above, discloses such an improved soil leveling apparatus. It has been found, however, that even this device can be improved upon. For example, under some soil conditions it has been found that the effectiveness of a leading ground engaging member of generally inverted U-shaped cross section can be severely restricted if it should become plugged with soil. In addition, three-point hitches of various types and ages exhibit various degrees of looseness which may not be compatible with different soil conditions. Some degree of play or looseness at the top link of the three-point hitch is generally desirable because it enables the apparatus to float somewhat on the soil surface without undue gouging, however, too much looseness is undesirable.

Further, some conditions may call for soil working relatively less aggressive, but which is desired as a substitute for or in addition to, that type of soil working provided by the scarifier assembly.

There is, thus, a need for an improved soil leveling apparatus of even greater versatility.

SUMMARY OF THE INVENTION

The present invention comprises an improved soil leveling apparatus which overcomes the foregoing and other difficulties associated with the prior art. In accordance with the invention, there is provided a soil leveling apparatus having an improved frame, connection means for the hitch, and other features and options which enhance its capability and versatility.

The frame comprises a plurality of transverse ground engaging members, the leading member being a scraper member of generally inverted J-shaped cross section in order to avoid soil plugging. The frame includes a pair of laterally spaced apart side frame members which are of uneven channel-like configuration secured to opposite ends of the trailing ground engaging member so as to reduce construction costs while providing the necessary structural rigidity.

The trailing ground engaging members are of generally inverted rounded V-shaped cross section in order to provide a substantially upright surface for pushing the soil in a forward direction, with an inclined surface for lifting the soil in a rearward direction.

The connection means on the frame for securing the apparatus to a three-point hitch is of generally A-shaped configuration, which is also adapted to serve as the support for the adjustable scarifier assembly. This also simplifies construction of the soil leveling apparatus and enhances the structural integrity thereof. An adjustable lost motion linkage is preferably provided at the top end of the connection means for receiving the top link of a three-point hitch in order to provide the degree of play desirable under the particular conditions.

BRIEF DESCRIPTION OF DRAWINGS

A better understanding of the invention can be had by reference to the following Detailed Description in conjunction with the accompanying Drawings, wherein.

DETAILED DESCRIPTION

The entire disclosure of the co-pending parent, Application Ser. No. 224,458, filed Jan. 12, 1981, now U.S. Pat. No. 4,448,258 is incorporated herein by reference.

Figure 1:
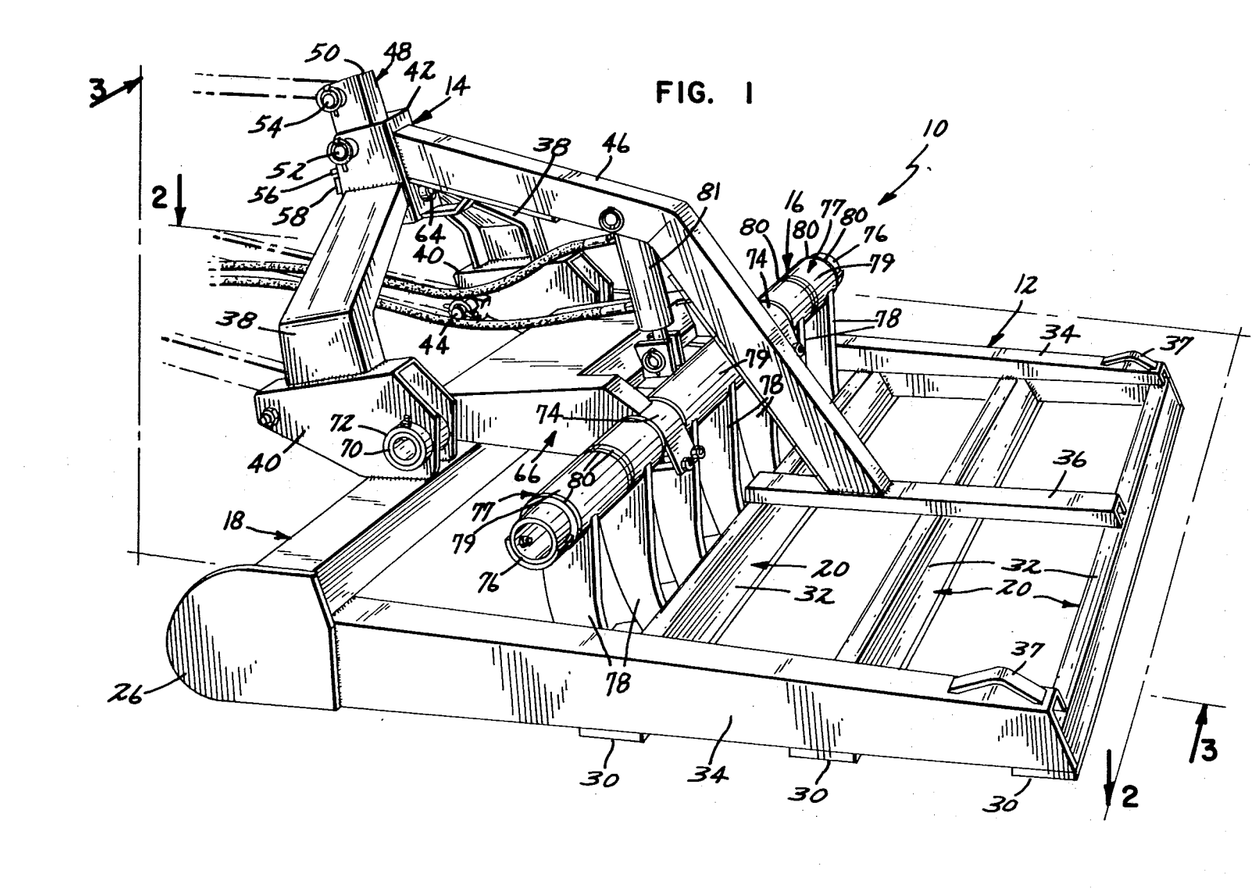
FIG. 1 is a perspective view of an improved soil leveling apparatus of the invention.

Referring now to the Drawings herein, in which like reference numerals designate like or corresponding elements throughout the views, and particularly referring to FIG. 1, there is shown a soil leveling apparatus 10 of the invention. The apparatus 10 comprises a frame 12, a hitch or connection means 14 mounted on the frame for attachment of the apparatus to a suitable draft means, and a scarifier assembly 16.

As illustrated, the connection means 14 is adapted for use with a three-point hitch, however, it will be appreciated that the frame 12 of the apparatus 10 can be provided with a connection means like that shown in the parent application for use with a skidsteer vehicle or any other suitable connecting hitch means depending upon the type of draft vehicle with which the apparatus is to be used.

Figure 2:
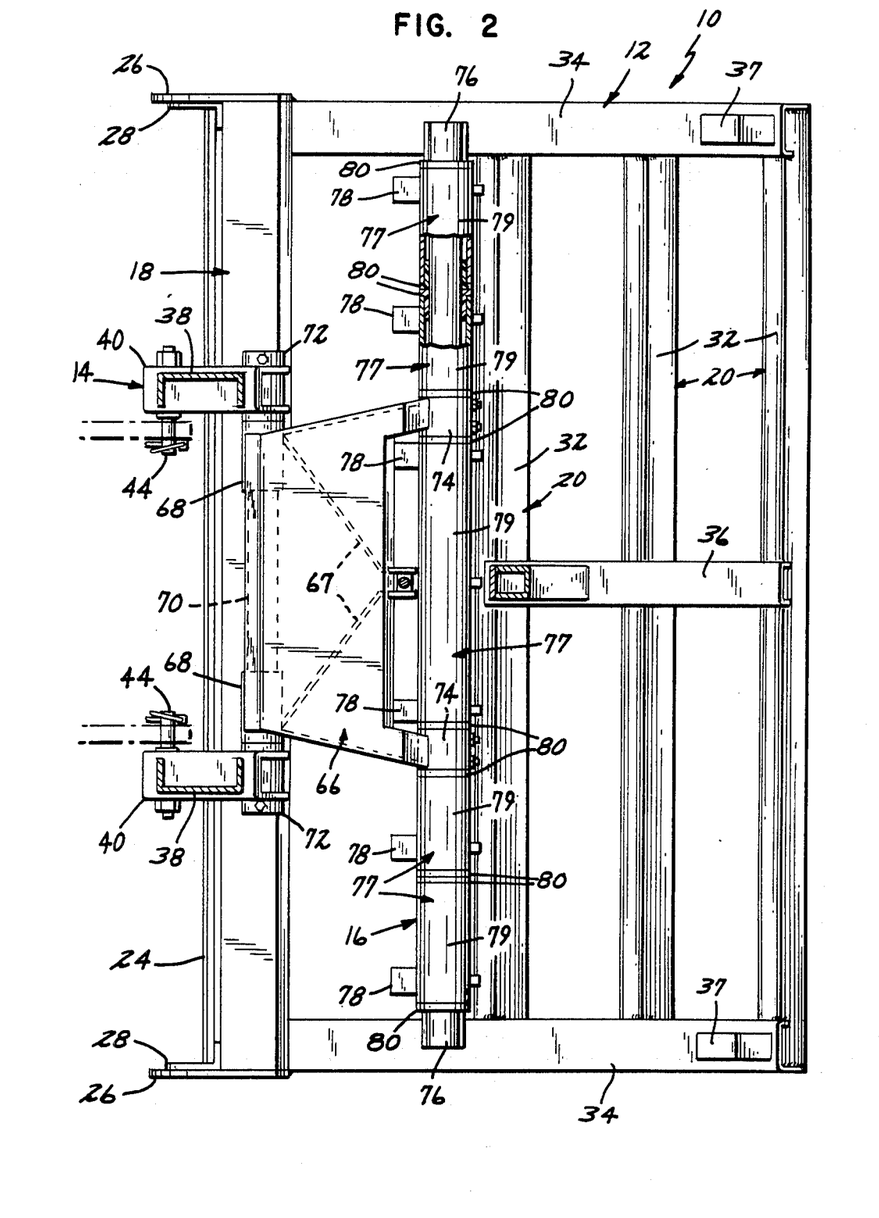
FIG. 2 is a horizontal sectional view taken along lines 2—2 of FIG. 1 in the direction of the arrow.
Figures 3, 6:
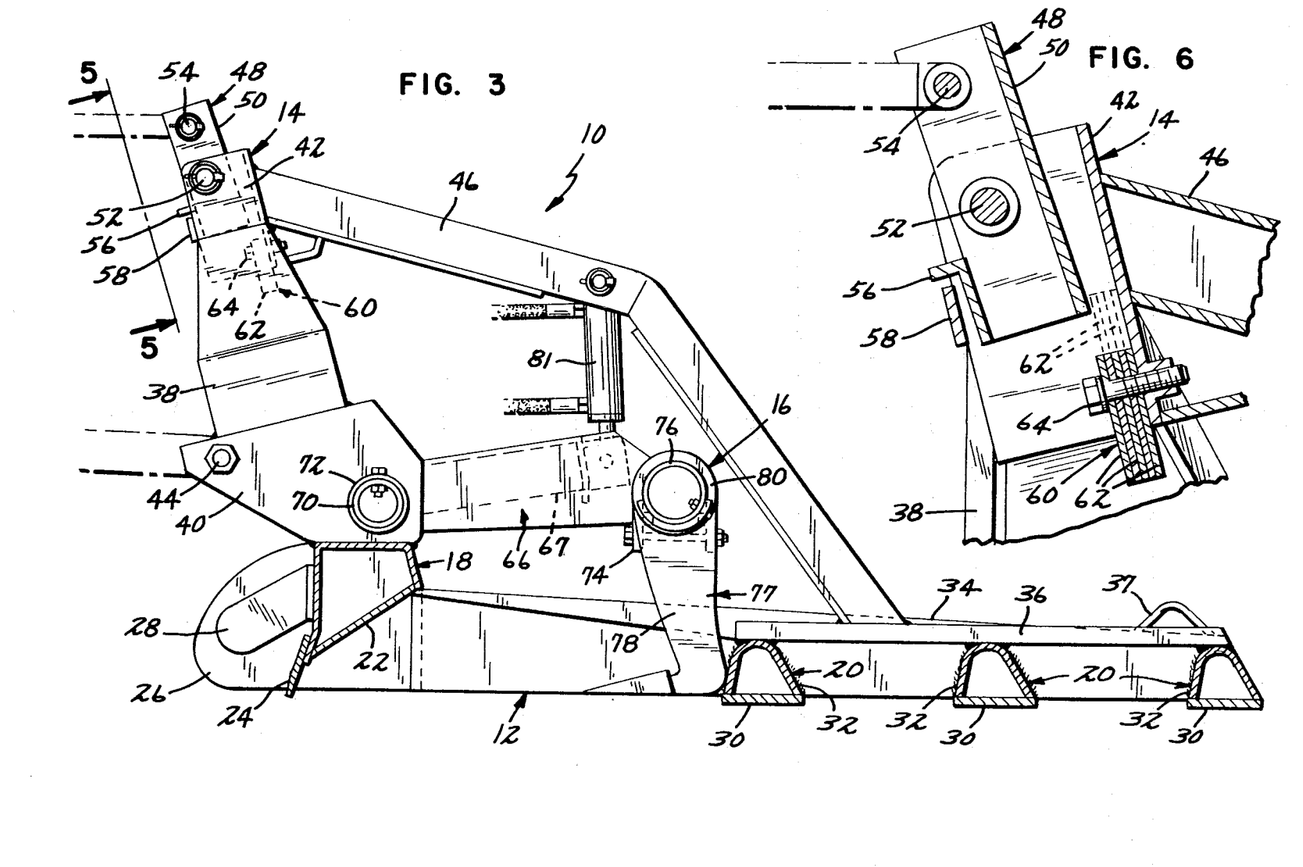
FIG. 3 is a vertical sectional view taken along lines 3—3 of FIG. 1 in the direction of the arrows.
FIG. 6 is a vertical sectional view taken along lines 6—6 of FIG. 5 in the direction of the arrows.

Referring now to FIG. 1 in conjunction with FIGS. 2 and 3, the frame 12 of the soil leveling apparatus 10 comprises a leading ground engaging member 18 and a plurality of trailing ground engaging members 20. All of the ground engaging members 18 and 20 are oriented transverse to the direction of travel of the apparatus 10. The forward ground engaging member 18, as is best seen in FIG. 3, is of generally inverted J-shaped cross section and includes braces 22 secured between the divergent front and back walls of the ground engaging member. A blade 24 is secured to the front, relatively longer wall of the ground engaging member 18 for better cutting action and wear resistance. The blade 24 can be welded, bolted or otherwise suitably secured to the forward ground engaging member 18. It will thus be apparent that the rear wall of the forward ground engaging member 18 is relatively shorter than the front wall. This is advantageous because it provides rigidity without allowing soil to plug the interior of the member, which can occur under certain conditions when an inverted channel section is utilized for the forward ground engaging member. The forward ground engaging member 18 thus functions as a scraper member.

The forward ground engaging member 18 is secured between a pair of side plates 26 which serve as soil retainers to prevent the soil from flowing outwardly around the apparatus and thus forming ridges. If desired, braces 28 can be secured between the soil retaining plates 28 and the forward ground engaging member 18 for reinforcement.

A plurality of trailing ground engaging members 20 are located behind the forward ground engaging member 18 for purposes of leveling the soil. Three trailing ground engaging members 20 are shown, however, any suitable number can be utilized. Each trailing ground engaging member 20 includes a wear plate 30 secured to and enclosing the open end of a hollow member 32. The hollow member 32 is preferably of generally inverted rounded V-shaped cross section with the forward wall thereof being substantially upright in order to push the soil in a forward direction, and the rear wall being inclined to allow the soil to pass over the ground engaging member in the reverse direction.

The trailing ground engaging members 20 are secured between a pair of longitudinal side members 34. Each side member 34 is of general channel-shaped cross section along the portion thereof extending between the trailing ground engaging members 20 with the upper surfaces of the side members sloping downwardly away from the forward ground engaging member 18. The ends of the trailing ground engaging members 20 are thus butted against the outer legs of the side members 34 and are welded at their ends both to the outer leg and to the lower edge of the inner legs of the side members. A longitudinal member 36 is preferably secured across the tops of the trailing ground engaging members 20 for additional rigidity. If desired, lugs 37 can be attached to the side members 34 for connection of a drag or the like to the apparatus 10.

The connection means 14 is of generally A-shaped configuration including a pair of legs 38 which are secured at their lower ends to a pair of laterally spaced apart feet or supports 40 secured to the forward ground engaging member 18. The legs 38, which are inclined forwardly as shown, extend upwardly to a member 42. The connection means 14, as illustrated, is adapted for use with a three-point hitch, the top and bottom links of which are indicated by phantom lines. The base supports 40 include pivotal connection points 44 for attachment to the bottom links of a three-point hitch, while the top member 42 is adapted for attachment to the top link of the three-point hitch. A longitudinal brace 46 is preferably connected between the top member 42 of the connection means 14 and the longitudinal member 46 of the frame 12.

Figure 5:
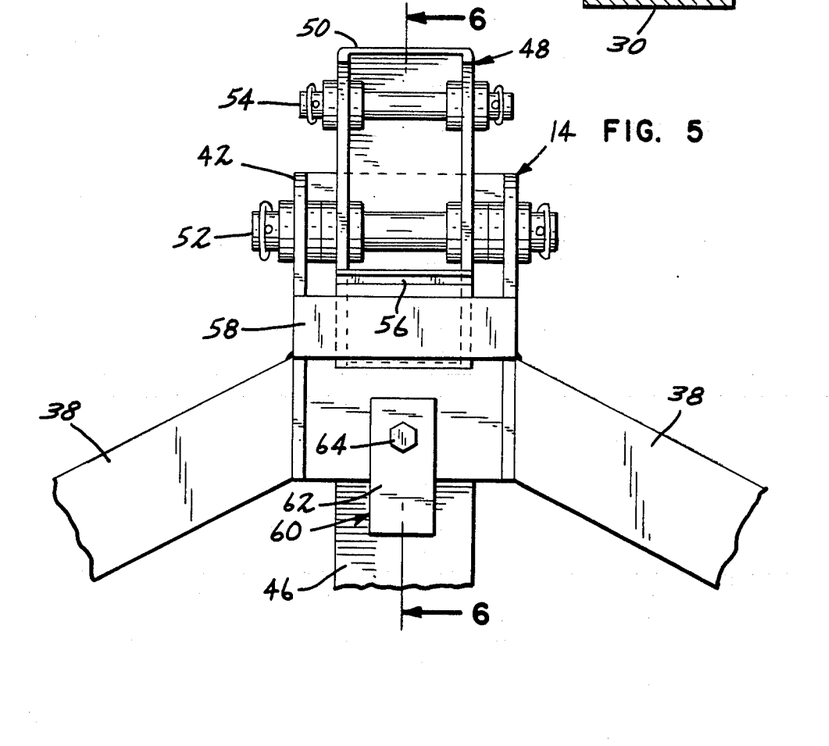
FIG. 5 is a view taken along lines 5—5 of FIG. 3 showing the front side of the adjustable lost motion linkage mounted at the top end of the connection means.

Referring to FIG. 3 in conjunction with FIGS. 5 and 6, the soil leveling apparatus 10 preferably includes a lost motion linkage 48 in the top member 42 of the connecting means 14. The purpose of the lost motion linkage 48 is to provide an adjustable amount of controlled play between the top link of the three-point hitch on the draft vehicle (not shown) and the connection means 14 so that some pivotal floating action of the soil leveling apparatus can occur. The lost motion linkage 14 includes a plate 50, which is illustrated as being a section of channel stock, supported for pivotal movement on a pin 52 extending across the top member 42. Another pivotal connection 54 is provided at the upper end of the plate 50 for attachment to the top link of the three-point hitch on the draft vehicle. A first stop 56 is secured to the lower end of the plate 50 for cooperation with a cross piece 58 extending across the lower end of the top member 42. The lost motion linkage 48 thus includes a fixed stop which limits rearward pivotal motion of the plate 50. An adjustable stop 60 is also provided for limiting forward pivoting of the plate 50. As illustrated, the adjustable stop 60 comprises a number of shims 62 with offset holes therein through which a bolt 64 extends to secure the shims to the inside of the top member 42. It will thus be appreciated that the amount of pivotal motion of the plate 50 can be controlled by loosening the bolt 64 and turning a suitable number of shims upwardly between the lower end of the plate 50 and the back of the top member 42, as shown in FIG. 1, and then tightening the shims in place with the bolt 64 so as to limit the range of fore/aft pivotal movement of the linkage 48. This comprises a significant feature of the present invention. By means of the adjustable lost motion linkage 48, suitable play can be provided between the top link of a three-point hitch and the connection means 14 of the soil leveling apparatus 10.

Referring again to FIGS. 1 through 3, the soil leveling apparatus 10 preferably includes a scarifier assembly 16 which is mounted for adjustable, vertical positioning relative to the frame 12. The scarifier assembly 16 includes a single connector 66 having a pair of sleeves 68 secured at the forward end for receiving a cross shaft 70 extending between the base members 40 of the connection means 14. The cross shaft 70 extends through the sleeves 68 of the connectors 66 and through bushed holes in the base members 40, and is retained in place be means of collars 72.

The connector 66, which is preferably formed from a piece of plate bent as shown for rigidity, also includes a pair of clamps 74 at the side opposite that of the sleeves 68. Clamps 74 function to secure the pivotal connector 66 to a second, relatively longer cross shaft 76 on which the teeth subassemblies 77 are suspended in side-by-side relationship between end caps 75. Each subassembly 77 includes a depending tooth 78 secured at its upper end to a sleeve 79 pivotally supported on the second cross shaft 76. The scarifier teeth 78 can be individually pivoted to the cross shaft 76, or pivotally supported in groups. Bushings 80 are provided in the ends of each sleeve 79. A double acting cylinder 81 is connected between the top brace 46 and a pair of lugs on the connector 66 for controlling the position of the scarifier assembly 16 and thus the extent of penetration into the soil by the teeth 78.

If desired, a pair of diagonal braces 67, as is best seen in FIG. 2, can be provided on the underside of the connector 66 for reinforcement.

Figure 4:
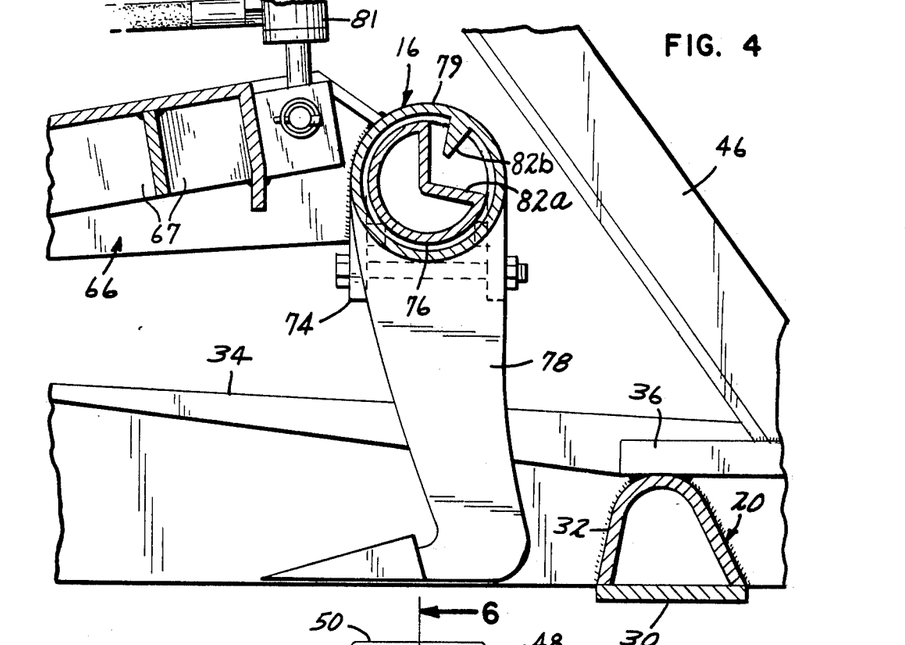
FIG. 4 is an enlarged detailed view of a modification of the scarifier stop assembly.

Referring momentarily to FIG. 4, there is shown a modification of the scarifier assembly 16. The scarifier assembly 16 as shown in FIGS. 1 through 3 includes a number of pivotal scarifier teeth 78 whose rearward pivotal motion is limited by the adjacent trailing ground engaging member 20. The longitudinal spacing between the forward ground engaging member 18 and the next adjacent ground engaging member 20 is preferably sufficient to allow the scarifier teeth 78 to pivot forwardly out of ground engagement when the apparatus 10 is reversed. In some situations, however, it may be desirable to limit pivotal movement of the scarifier teeth 78 by means other than the next adjacent trailing ground engaging member 20. For example, the second cross shaft 76 can be notched as shown in FIG. 4 for cooperation with an inwardly projecting stop 82 provided on the sleeve supporting the tooth. The particular orientation of the notch in the cross shaft 76 and the stop 82 is not critical to the invention, however, in some situations it may be desirable to rotate their position about 150 degrees clockwise from that shown for better load distribution. Those skilled in the art will appreciate that the disclosed stop arrangement can be reversed so that a stop member is provided on the cross shaft 76 for cooperation with a notch in the sleeve supporting the scarifier teeth 78. This is considered fully equivalent.

Figure 7:
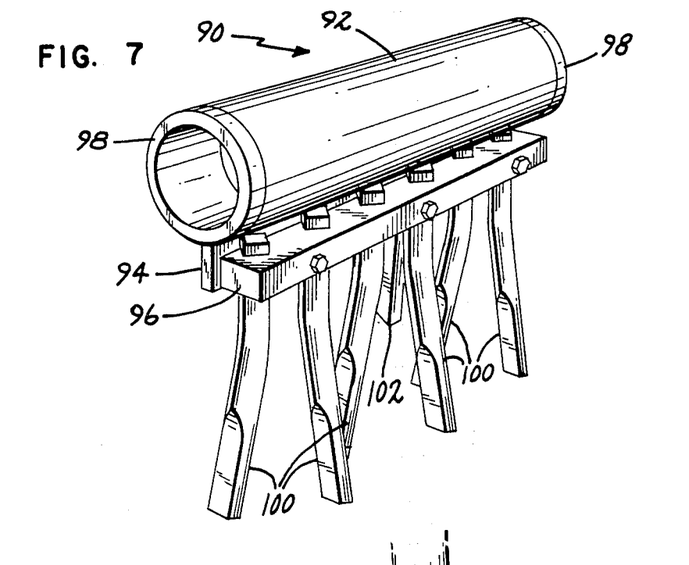
FIG. 7 is an enlarged perspective detailed view showing a tine assemble which can be substituted for the teeth of the scarifier assembly in order to provide relatively less aggressive soil working action.
Figure 8:
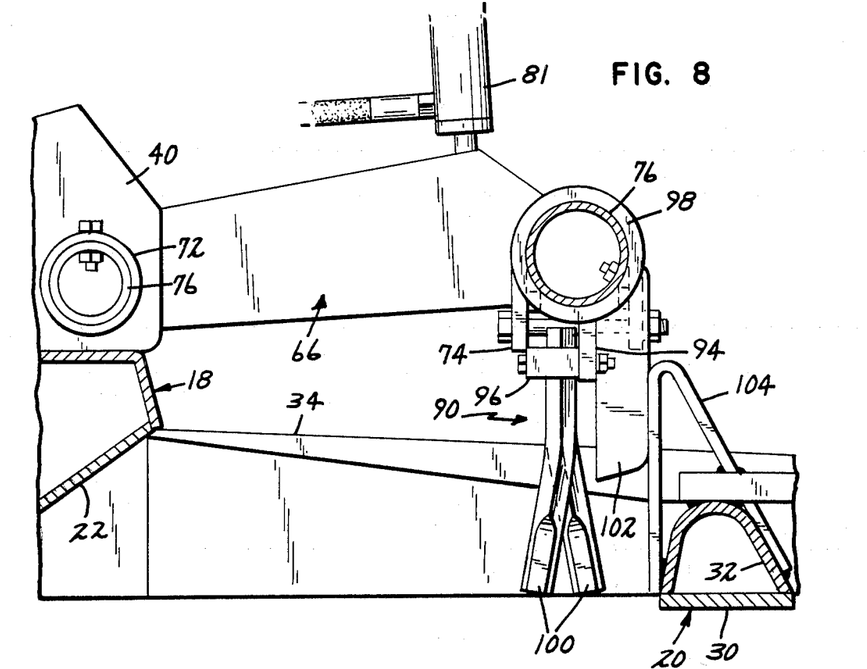
FIG. 8 is a sectional detailed view showing the tine assembly of FIG. 7 mounted on the cross-shaft of the scarifier assembly.

FIGS. 7 and 8 illustrate another modification of the scarifier assembly 16. Some conditions call for working the soil less aggressively than the scarifier teeth 78 would provide. In such situations, tine subassemblies 90 can be substituted for the scarifier subassemblies 77 on the cross shaft 76. Each tine subassembly 90 includes a sleeve 92 with a flange 94 and tool bar 96 secured thereto. Bushings 98 of plastic or other suitable construction are preferably provided in opposite ends of the sleeve 92. A plurality of depending tines 100 are secured to the tool bar 96. As illustrated, the lower ends of the tines 100 diverge outwardly, however, this is not critical to practice of the invention and either straight or curved tines can be utilized as desired. Each tine subassembly 90 further includes a stop 102 thereon for cooperation with another stop 104 mounted on the next adjacent trailing ground engaging member 20. Since the tines 100 are generally less rigid than the scarifier teeth 78, the use of such separate stop structure is preferable. If desired, of course, such separate stop structure could also be adapted for use with the scarifier subassemblies 77. Another cylinder 136 is coupled between the frame brace 46 and the forward cross member 122 of the attachment 110 for controlling its pivotal positioning.

Figure 9:
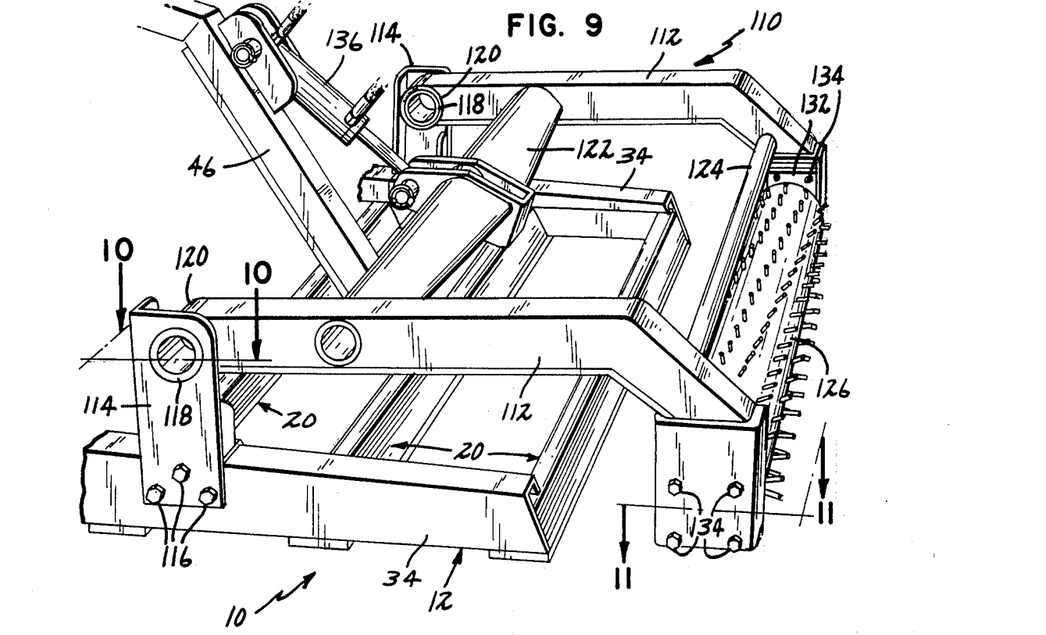
FIG. 9 is a partial perspective view showing the soil leveling apparatus herein with an optional pivotal pulverisor assembly mounted thereon; and, FIGS. 10 and 11 are sectional views taken along lines 10—10 and 11—11, respectively, of FIG. 9 in the direction of the arrows.
Figure 10:
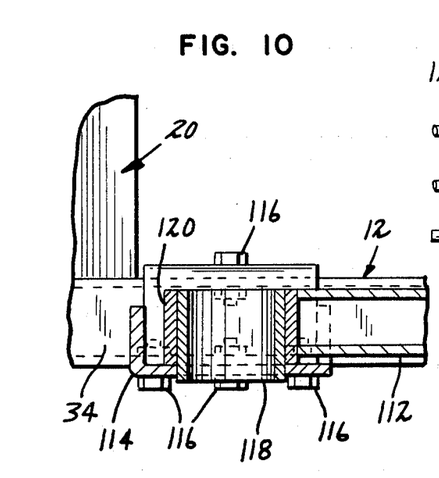
Figure 11:
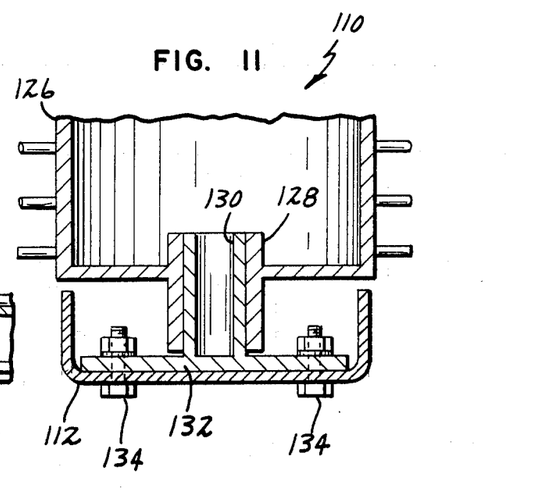

Referring now to FIGS. 9, 10 and 11, there is shown an optional pulverizer attachment 110 which can be mounted on the soil leveling apparatus 10 to provide additional soil working. The attachment 110 includes a pair of arms 112 which are pivoted at their forward ends to brackets 114 secured by bolts 116 to the side members 34 of frame 12. Each bracket 114 includes an inner sleeve 118 on which an outer sleeve 120 of the associated arm is received to define a pivot. A pair of cross members 122, 124 are secured between the arms 112 for rigidity and bracing. A toothed roller 126 is mounted for rotation between the outer or trailing ends of the arms 112. As is best seen in FIG. 11, a bushing 128 is provided in each end of the roller 126 for rotation on an inwardly projecting trunion 130 on a plate 132 secured by bolts 134 to the associated arm 112. This type of mounting enables the roller 126 to span substantially the entire width of the apparatus 10 so that the apparatus can be operated closely adjacent to buildings, sidewalks, etc. Although the assembly 110 is illustrated with a toothed roller 126 for pulverizing small dirt clods and the like, it will be appreciated that other devices can be mounted on the attachment. For example, a row of spring fingers or flexible tines can easily be substituted for the toothed roller 126 and carried by the attachment 110.

From the foregoing, it will thus be apparent that the present invention comprises an improved soil leveling apparatus having several advantages over the prior art. One significant advantage involves use of an adjustable lost motion connection with the connecting means to provide controlled flexibility and some float of the apparatus in order to compensate for various three-point hitches and soil conditions. Another advantage involves the use of a forward ground engaging member which is not susceptible to clogging under sticky soil conditions in order to perform a scraping function more effectively. The connecting means also serves as the primary support for the scarifier assembly. Other advantages will be evident to those skilled in the art.

Although particular embodiments of the invention have been illustrated in the accompanying drawings and described in the foregoing detailed description, it will be understood that the invention is not limited only to the embodiments disclosed, but is intended to embrace any equivalents, modifications, substitutions and/or rearrangements of elements falling within the scope of the invention as defined by the following claims.

What is claimed is:

1. An adjustable lost motion connection for mounting between the top link of a three-point hitch and an attachment, which comprises:
   an outer channel section secured to the attachment, said outer channel section having top and bottom ends;
   an inner channel section extending into the top end of said outer channel section, said inner channel section having top and bottom ends;
   means for supporting said inner channel section for pivotal movement relative to said outer channel section;
   means for connecting the top link of the three-point hitch to said inner channel section in predetermined spaced relationship above the transverse axis;
   a fixed stop on said outer channel section for limiting pivotal movement of said inner channel section in a direction away from the three-point hitch; and,
   an adjustable stop on said outer channel section for limiting pivotal movement of said inner channel section in a direction toward the three-point hitch.

2. An apparatus for leveling soil and the like, comprising:
   a generally rectangular frame including a transverse, elongate scraper member and a plurality of trailing transverse elongate ground engaging members fixedly secured in mutually spaced apart relationship between a pair of longitudinal side members;
   the scraper member being of generally inverted J-shaped cross section with a leading lower edge and each ground engaging member including a lower surface, with the leading edge of the scraper member and the lower surfaces of the ground engaging members being substantially coplanar;
   a hitch mounted on said frame for releasable connection to a draft means, said hitch including a pair of laterally spaced apart bottom connection points and a top connection point located in spaced relationship between and above the bottom connection points; and
   adjustable lost motion linkage means mounted on the top connection point of said hitch for limiting free pivotal movement of the apparatus toward and away from the draft means about a transverse axis defined by the bottom connection points.

3. The soil leveling apparatus of claim 2, wherein the ground engaging members of said frame have curved top surfaces of generally inverted rounded V-shaped cross section.

4. The soil leveling apparatus of claim 2, wherein said hitch is of generally A-shaped configuration mounted on the scraper member of said frame and further including:
   a longitudinal brace secured between said hitch and said ground engaging members.

5. The soil leveling apparatus of claim 2, further including:
   a scarifier assembly mounted for vertical movement on said frame; and,
   means for adjusting vertical positioning of said scarifier assembly.

6. An apparatus for leveling soil and the like, comprising:
   a generally rectangular frame including a transverse, elongate scraper member and a plurality of trailing transverse elongate ground engaging members fixedly secured in mutually spaced apart relationship between a pair of longitudinal side members;
   the scraper member being of generally inverted J-shaped cross section with a leading lower edge and each ground engaging member including a lower surface, with the leading edge of the scraper member and the lower surfaces of the ground engaging members being substantially coplanar;
   a hitch mounted on said frame for releasable connection to a draft means, said hitch including a pair of laterally spaced apart bottom connection points and a top connection point located in spaced relationship between and above the bottom connection points; and
   an adjustable lost motion linkage mounted on the top connection point of said hitch;
   said adjustable lost motion linkage including:
      a plate mounted for pivotal movement about the top connection point of said hitch, said plate having an upper end;
      a pivotal connection point at the top end of said plate;
      an adjustable stop on said hitch for limiting pivotal movement of the upper end of said plate away from the draft means; and
      an adjustable stop on said hitch for limiting pivotal movement of the upper end of said plate toward the draft means.

7. An apparatus for leveling soil and the like, comprising:
   a generally rectangular frame including a transverse, elongate scraper member and a plurality of trailing transverse elongate ground engaging members fixedly secured in mutually spaced apart relationship between a pair of longitudinal side members;
   the side members of said frame each being of generally channel-shaped cross section having an outer leg with a straight lower edge which is substantially parallel with the lower edge of the scraper member and the lower surfaces of the ground engaging members, and an inwardly spaced inner leg with a straight lower edge which is secured to and extends across the ground engaging members;
   the scraper member of said frame being of generally inverted J-shaped cross section with a leading lower edge and each ground engaging member including a lower surface, with the leading edge of the scraper member and the lower surfaces of the ground engaging members being substantially coplanar;
   a hitch mounted on said frame for releasable connection to a draft means, said hitch including a pair of laterally spaced apart bottom connection points and a top connection point located in spaced relationship between and above the bottom connection points; and
   an adjustable lost motion linkage mounted on the top connection point of said hitch.

8. A soil leveling apparatus which comprises:
   a generally rectangular frame including a leading transverse scraping member and a plurality of trailing transverse ground engaging members fixedly secured in mutually spaced apart relationship between a pair of longitudinal side members;

the scraper member of said frame being of generally open inverted J-shaped cross section with a lower edge, and each ground engaging member being of generally closed tubular construction having a lower surface with the lower edge of the scraper member and the lower surface of the ground engaging members being substantially coplanar;

a hitch for releasably connecting said frame to a draft means, said hitch being of generally A-shaped configuration having a pair of legs secured to the scraper member of said frame and defining a pair of laterally spaced-apart bottom connection points, the legs of said hitch extending upwardly to define a top connection point located between and above the bottom connection points;

a first cross shaft extending between the legs of said hitch;

a second cross shaft pivotally connected to said first cross shaft and extending in generally parallel, spaced apart relationship adjacent to the scraper member of said frame;

a plurality of depending soil working tools pivoted to said second cross shaft;

means connected to said second cross shaft for selectively adjusting vertical positioning of the said second cross shaft and said soil working tools; and, an adjustable lost motion linkage connected to the top connection point of said hitch.

* * * * *